United States Patent
Jennings et al.

(10) Patent No.: US 6,276,644 B1
(45) Date of Patent: Aug. 21, 2001

(54) COMPACT CABLE ANCHOR FOR RETAINMENT AND ATTACHMENT OF CABLES AND TUBING

(76) Inventors: Gilbert M. Jennings, 774 S. Cambridge Dr.; Val Carpenter, 853 Red Rock Rd., both of St. George, UT (US) 84770

( * ) Notice: Subject to any disclaimer, the term of this patent is extended or adjusted under 35 U.S.C. 154(b) by 0 days.

(21) Appl. No.: 09/528,685

(22) Filed: Mar. 20, 2000

(51) Int. Cl.$^7$ .................................................. F16L 3/00
(52) U.S. Cl. .............................. 248/49; 248/63; 248/60; 248/67.7; 248/74.2; 248/74.5; 248/65; 411/410; 411/478; 411/456; 411/386
(58) Field of Search ......................... 248/49, 63, 60, 248/67.7, 74.2, 74.5, 67, 231.91, 230.6, 230.7, 71, 65; 411/410, 478, 456, 385

(56) References Cited

U.S. PATENT DOCUMENTS

| | | |
|---|---|---|
| D. 257,950 | 1/1981 | VanMeter ................... D8/396 |
| 3,583,663 * | 6/1971 | Snow, Jr. .................... 348/71 |
| 3,633,250 * | 1/1972 | Romney ..................... 24/91 X |
| 3,737,128 | 6/1973 | Schuplin .................... 248/71 |
| 3,810,279 | 5/1974 | Swick ....................... 411/509 |
| 3,848,840 * | 11/1974 | Umezu ...................... 248/73 |
| 3,905,570 | 9/1975 | Nieuvveld .................. 248/71 |
| 3,951,367 | 4/1976 | Hagelberg .................. 248/71 |
| 3,982,304 | 9/1976 | Menshen ................... 24/73 AP |
| 4,095,744 * | 6/1978 | Villelli ....................... 239/1 |
| 4,175,728 * | 11/1979 | Ferguson ................... 269/91 |
| 4,260,122 | 4/1981 | Fiala ......................... 248/71 |
| 4,260,123 | 4/1981 | Ismert ....................... 248/74 R |
| 4,318,208 | 3/1982 | Borja et al. ................ 24/305 |
| 4,396,329 | 8/1983 | Wollar ...................... 411/508 |
| 4,509,710 | 4/1985 | Cooper ..................... 248/73 |
| 4,588,152 | 5/1986 | Ruehl ....................... 248/71 |
| 4,609,170 | 9/1986 | Schnabl .................... 248/71 |
| 4,903,920 | 2/1990 | Merritt ...................... 248/71 |
| 5,108,054 | 4/1992 | Degand ..................... 248/50 |
| 5,150,865 * | 9/1992 | Miller ....................... 248/71 |
| 5,209,441 | 5/1993 | Satoh ....................... 248/74.2 |
| 5,306,098 | 4/1994 | Lewis ....................... 411/510 |
| 5,725,185 | 3/1998 | Auclair ..................... 248/74.2 |
| 5,743,061 | 4/1998 | Rolph ....................... 52/698 |
| 5,800,109 | 9/1998 | Carruthers ................. 411/510 |
| 5,845,883 * | 12/1998 | Meyer ...................... 248/73 |
| 5,846,017 * | 12/1998 | Meyer ...................... 403/397 |
| 5,887,319 | 3/1999 | Smith ....................... 24/293 |
| 6,161,804 * | 12/2000 | Paske et al. ............... 248/74.1 |

FOREIGN PATENT DOCUMENTS

| | | |
|---|---|---|
| 1384307 | 2/1964 | (FR) . |
| 2151175 | 7/1973 | (FR) . |
| 401379 | 1/1943 | (IT) . |

* cited by examiner

*Primary Examiner*—Leslie A. Braun
*Assistant Examiner*—A. Joseph Wujciak

(57) ABSTRACT

A novel cable anchor for retainment and attachment of cables and tubing which utilizes a one-piece A-shaped rigid body (11) comprising of a U-shaped top (12) having the front, back and bottom open having two extensions one W-shaped left side extension (13) and one W-shaped right side extension (14) both extensions extending in a downward direction having 40 degrees more or less between the extensions. The W-shaped extensions having a barb surface located at the extreme outer surfaces of the W-shape. The U-shaped top (12) having an attachment hole (15) located at the top center. When manual pressure is applied on the outer surfaces of the extensions causing the extensions to move closer towards each other until the extensions are touching each other in the closed position thereby allowing the A-shaped rigid body (11) to be received in a bored hole of a substructure. The U-shaped top (12) may be flattened to facilitate the attachment of a separate cable clip or the like.

4 Claims, 2 Drawing Sheets

COMPACT CABLE ANCHOR FOR RETAINMENT AND ATTACHMENT OF CABLES AND TUBING

BACKGROUND—FIELD OF INVENTION

This invention relates in general to cable anchors, in particular to a one-piece A-shaped cable anchor which is used for retainment and attachment of phone lines, coax cable (TV cable), cable clips or any other type electrical or non-electrical cable or all types of tubing which needs to be held in a fixed position at various locations during or after the installation of the cable or tubing.

BACKGROUND—DESCRIPTION OF PRIOR ART

Prior art cable anchors are very elaborate having multiple elements for securing a cable in a fixed position. In many cases the prior art can't be used to anchor an attached separate cable clip in a fixed position. The difficulties with the prior art cable anchors they are not compact in design and lack the ability to be used as a cable clip with its own anchor an as a cable anchor for attachment of a separate cable clip.

Another type self adjusting spring fastener is used for securing one sheet of material to another sheet of material. It is an elaborate design and has multiple elements. Therefore, it costs more to manufacture and cannot be used as an attachment anchor for a separate cable clip.

Another type fastener with a tapered section and a slot is made of two pieces which must be used together to accommodate each other and must be hammered together causing a problem at assembly of the attached cable clip. The center piece must be hammered fully home making it very difficult in placing one object to another object without damaging the object being attached to the prior art fastener.

Another type wall anchor is an elaborate design having an inclined plane which is secured to a second inclined plane by a connector. The connector is resilient allowing the two inclined planes to move in relation to each other. Therefore, this design is such that the connector can become loose and can separate from the inclined surfaces causing the connector to detach itself from the inclined surfaces thereby having a failure.

Another type cable clalmp bracket assembly having a base which is mounted to a fixed base and having two clamp mounting clips for clamping a cable to the base. Therefore, this prior art is limited to a cable clamp and not able to be used as a cable anchor for a separate cable clip. If it were used to anchor a cable clip it would not be a permanent anchor.

Another type plastic drive fastener is a one-piece plastic drive fastener having an enlarged head with a cylindrical shank. This design has no cable retainment element. Therefore, it is not a combination of a cable retainment and attachment. Therefore, my invention is a combination of cable retainment and attachment in one compact design.

Another type clamp for rod-like articles including a clamp plate having a clamp body on its upper surface and a fastening plate having an anchor on its bottom surface and a hinge connecting the two plates together. Therefore, this design is limited for retainment of cables and cannot be used to attach other type cable clips to it.

Another type tube anchor used to support a neon tube or the like. Therefore, this design is not a compact cable anchor for retainment and attachment for cables or tubing. It cannot be used to retain a cable in a permanent position because of the open space at the top of the saddle.

Another type cable clip is limited to retain a cable against a mounting surface by the means of a nail in both the upper and lower surfaces. Therefore, this design is limited to retaining a cable and is not a compact cable anchor for retainment and attachment of a separate cable clip.

Another type fastening element having a saddle type element for retaining the cable which could allow the cable to be pulled out of the saddle element. Therefore, this design is limited. It has no means of permanent retainment of the cable and cannot be used as a cable anchor for attachment of a separate cable clip.

Another type stucco wall fastener having a block member with a hole for receiving a nail used to attach the block member to a stucco wall. Therefore, this design is limited to retaining a wire or the like but has no means to be used as a cable anchor for attachment of a separate cable clip.

Another type cable clamp molded in one piece from plastics material having clamping limbs and each clamping limb having a rigid portion which is joined at a bearing portion. The clamping limbs can collapse around the wires and a latching tongue is received in a latching eye causing the cable clamp to latch thereby going into a clamping condition. Therefore, this design is limited to retain wires or the like but is not able to be used as a cable anchor to attach a separate cable clip.

Another type pine tree clip having a one-piece drive fastener with a head, a rigid shank, a plurality of rigid ribs. Therefore, this design is limited as a clip and not a combination of clip and anchor.

Another type fastening system made up of two plastic fasteners for securing two work pieces together. This design is limited. It's not for retainment or attachment of a cable or tubing. Therefore, my invention is specifically designed for retainment and attachment of a cable or tubing or its own clip to the cable anchor or attachment of a separate cable clip.

Another type tubing hanger for supporting a tube and the like. It has a rectangular shaped base with resilient arms extending outward from the base which converge in opposed direction having a cavity sized for receipt of a tube. The tube hanger is secured to a mounting surface by means of a nail. Therefore, its design is not a cable anchor for retainment and attachment of cables and tubing. It is limited to retainment of a tube and not capable of attachment of a separate cable clip.

Another type clamping plug for elongated cables and tubing having a double-leg plug has its shanks connected together at one end by an arcuate hinge ligature which is of circular configuration. The shanks can be brought together and inserted in a hole in a wall. This design is limited to retainment of a cable or the like. Therefore, my invention is not only for retainment of cable but also an attachment anchor for cables or tubing.

Another type plastic clamping apparatus having integrally molded plastic clamping apparatus comprising of a body having a plurality of recesses formed for receiving a cable or the like, and a mounting means and a hinge portion formed between the body portion and the mounting means. This design is limited to retainment of cables and the like but is not for attachment of a separate cable clip. Therefore, my invention has the capability of retainment as well as attachment of a separate cable clip.

Another type fastener having a first portion arranged to hold a cable or the like and a second peg-shaped portion that can be placed in a hole. This design is limited to retainment of a cable or the like but does not have the ability to be used as a cable anchor for attachment of a separate cable clip. Therefore, my invention has both features of retainment and attachment as a cable anchor.

Another type resilient fastening device having a head and a plurality of resilient legs spaced apart and projecting from the head. This design has a saddle shaped retainment means which cannot permanently retain the cable or the like. The cable can be pulled out of the saddle if one of either side of the saddle should break off or be bent out of shape. Also this design cannot be used for a cable anchor or a separate cable clip attachment. Therefore, my invention has the ability to do both permanently retain and if required used as an anchor to attach a separate cable clip.

Another type plastic drive fastener having a head and a shank. This design as no means for retainment of a cable or tube but does have the means as an anchor to a surface for attachment of a cable clip. Therefore, my invention has the combination feature for retainment and/or attachment of cables or tubing or attachment of a separate cable clip.

Another type cable support clip having flexible fins or like means which allows entry of the shank portions of the clip in a hole, and resist removal of the clip from the hole. This design has no means to be used as a cable anchor for attachment or a separate cable clip. Therefore, my invention has means for retainment of a cable or tubing and has means for attachment of a separate cable clip when used as an anchor for a cable clip.

Another type tubing clip having a saddle shape for retainment of a cable or the like a shank that is received in a hole. This design cannot permanently retain a cable because of the saddle shape having an open space for the cable to be pulled up and out. Also, this design has no ability to be used as a cable anchor for attachment of a separate cable clip. Therefore, my invention has the combination of cable retainment as well as cable clip attachment to the cable anchor.

OBJECTS AND ADVANTAGES

Accordingly, besides the objects and advantages described above, several objects and advantages of the present invention are:

(a) to provide a cable anchor that is compact, without reducing its ability to hold a cable or tubing in a fixed position, which has been limited with the prior art.

(b) To provide a cable anchor in which the body that supports the cable or tubing is a simpler construction and less expensive to construct than the prior art.

(c) To provide a cable anchor that greatly increases the ease of installation than the prior art.

(d) To provide a cable anchor that can support itself without any other means of support.

(e) To provide a cable anchor, because of its design, to have a much greater holding strength than the prior art.

(f) To provide a cable anchor that can be reused if required by using a larger receiving hole for the cable anchor.

It is the feature of the present invention that it provides a cable anchor comprising of a one-piece A-shaped rigid body which can be made to flex when pressure is applied to the flexible side extension area giving it a smaller area to allow the cable anchor to be placed in the receiving receptacle.

(g) To provide a cable anchor that can be used to attach a separate cable or tubing clip.

(h) To provide a cable anchor to be a permanent fixture that can be used many times by receiving different types of attachments. Because of the flattened shape of the U-shaped top.

(i) It allows the mechanical means of attachment of a separate cable clip by passing through the top hole and engaging between the W-shaped extensions causing pressure to be applied outward thereby giving a greater holding pressure for the cable anchor. When the mechanical means of attachment is removed from the cable anchor the cable anchor can be removed from the bored hole in the substructure.

(j) It permits placing of the cable anchor to the substructure before running the cable or tubing itself or it allows placing the cable clip on the cable or tubing itself before running the cable or tubing.

It is the feature of the present invention that it provides a cable anchor comprising of a one-piece Λ-shaped rigid body having a U-shaped top having an open front, back and bottom having sufficient space to receive a cable or tubing having a W-cross sectional shape left side extension having sufficient length extending downward from the left side of U-shaped top having an approximately 20 degree bend from the center of the one-piece Λ-shaped rigid body having sufficient radius transition to the left outward direction where U-shaped top stops and W-cross sectional shape right side extension having sufficient length extending downward from the right side of U-shaped top having an approximately 20 degree bend from the center of the one-piece Λ-shaped rigid body having sufficient radius transition to the right outward direction where U-shaped top stops and W-cross sectional shape right side extension begins. The one-piece Λ-shaped rigid body which can be made to flex when pressure is applied in the inward direction to the side extensions causing the side extensions to come closer together allowing the extensions to be received by the bored hole in the item receiving the cable anchor extensions. The U-shaped top has an attachment hole at the top center, which allows the attachment of a separate cable clip. No prior art has combined these two features of a Λ-shaped rigid body as a cable clip and a cable anchor in one.

It is an object of the present invention to provide an improved cable anchor for retainment and attachment of cables or tubing.

Other objects and features are readily apparent from the following description of certain preferred embodiments thereof taken in conjunction with the accompanying drawings although variations and modifications may be affected without departing from the sphere and the scope of the normal concepts of the disclosed invention. You will find future objects and advantages of the invention from a consideration of the ensuing descriptions and accompanying drawing.

DRAWING FIGURES

Figure 1:
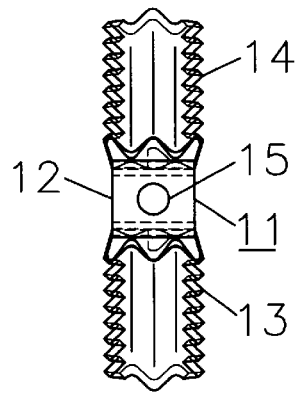
FIG. 1 Shows a top view of the cable anchor in the open position.

DRAWING REFERENCE NUMERALS 11 one-piece A-shaped rigid body
12 U-shaped top with open front, back and bottom
13 W-shaped left side extension
14 W-shaped right side extension
15 Attachment hole

DESCRIPTION OF INVENTION

Figure 2:
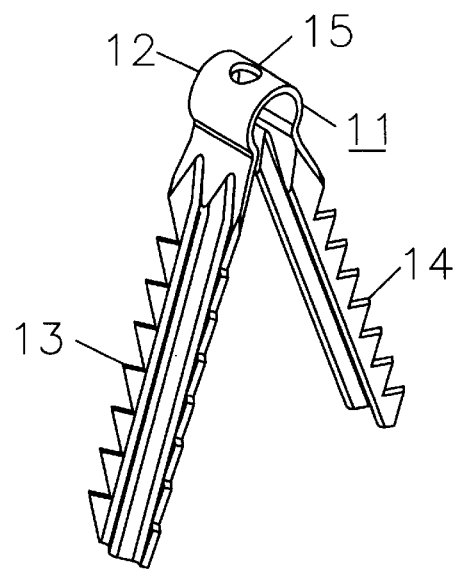
FIG. 2 Shows a perspective view of the cable anchor in accordance with the invention.
Figure 3:
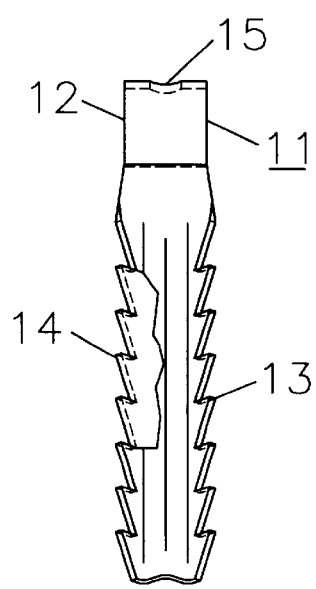
FIG. 3 Shows a typical side view of the cable anchor.
Figure 4:
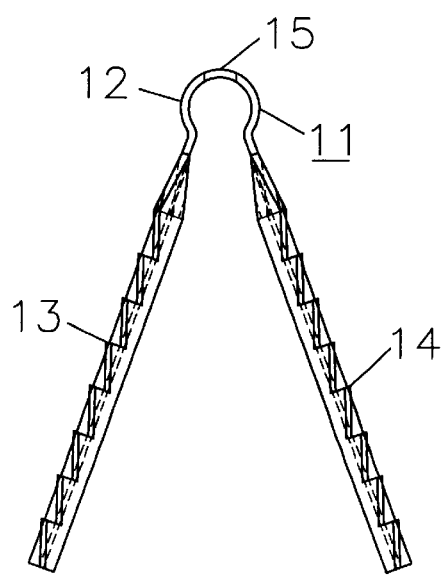
FIG. 4 Shows a front view of the cable anchor in the open position.
Figure 5:
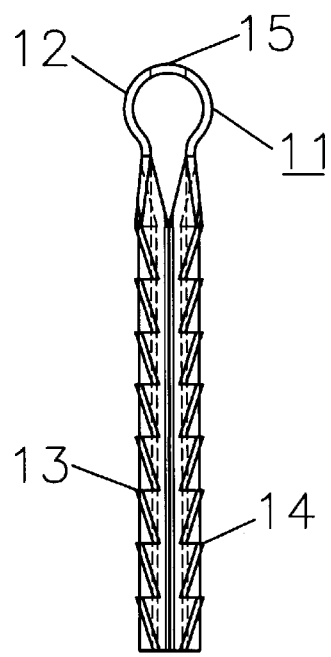
FIG. 5 Shows a front view of the cable anchor in the closed position.
Figure 6:
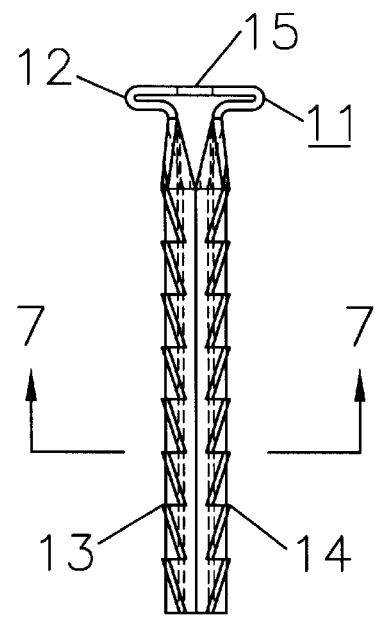
FIG. 6 Shows a front view of the cable anchor in the closed position with the U-shaped top flattened to facilitate an attachment through the attachment hole.
Figure 7:
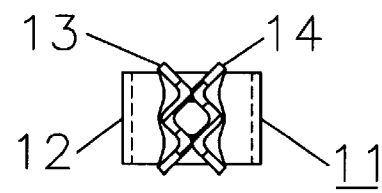
FIG. 7 Shows a sectional view of the W-shaped left side extension and the W-shaped right side extension in the closed position, taken along the line 7—7 FIG. 6.

The compact cable anchor for retainment and attachment of cables and tubing n in FIG. 1, FIG. 2, FIG. 3, FIG. 4, FIG. 5, FIG. 6 and FIG. 7, comprises of a one-piece A-shaped rigid body 11, having sufficient thickness, width and length, having the following features: a U-shaped top 12, having front, back and bottom open having sufficient space to receive a cable or tubing, having a W-shaped right side extension 14, being some what parallel to each other having approximate 40 degrees between them with each extension being extended in a downward direction from each side of the U-shaped top 12 forming a A-shaped rigid body 11, each W-shaped extension having a barb surface located at each extreme outer edge of the W-shape having sufficient space and surface as a locking device when pressure is exerted on the outer edge of both extensions causing the extensions to move towards each other causing the space between the extension to become shorter until both the W-shaped left side extension 13 and the W-shaped right side extension 14 touch each other in the closed position allowing the extensions to be received into a bored hole in the item receiving the extensions of the cable anchor, located at the top of the U-shaped top 12 an attachment hole 15 of sufficient size allowing a means for attachment of a cable clip if required. The U-shaped top 12 may be flattened to allow the required attachment of a cable clip to fit closer to the bored hole in the item receiving the cable anchor. Depending on the size of the bored hole in the item receiving the extensions of the cable anchor if the hole is large the cable anchor would not be completely pressed together thereby allowing the extensions to be pressed closer together thereby allowing the cable anchor to be removed from the bored hole in the item receiving the extensions. If the bored hole is small causing the extensions of the cable anchor to be completely together then the cable anchor would be permanently fixed to the item receiving the cable anchor.

Conclusion and Scope of Invention

Accordingly, the reader will see that the compact cable anchor for the retainment and attachment of cables and tubing of this invention has the ability to hold in place a cable or tubing. The cable anchor has the ability to hold a single or several cables or tubing at one time in a fixed position. Furthermore, the cable anchor has the additional advantages in that:

it provides a cable anchor that is compact, without reducing its ability to hold a cable or tubing in a fixed position.

it permits the cable anchor to be used as a cable clip with its own anchor or to be used as a cable clip with its own anchor or to be used as a cable anchor for a separate cable clip.

it allows the cable anchor to be reused if desired.

it permits quick installation of cables or tubing by allowing the cable anchors preinstalled on cable or tubing before final installation.

it provides compactness allowing the cable anchor to be a smaller configuration it allows the placing of the cable anchor to the substructure before running the cable or tubing itself thereby allowing the cable clips to be attached to the cable anchor when running the cable or tubing.

Although the description above contains many specifications, these should not be construed as limiting the scope of the invention but merely providing illustrations of some of the presently preferred embodiments of this invention. For example, the cable anchor A-shaped rigid body and flexible feature of the cable anchor A-shaped rigid body extensions locking device can have other shapes, such as square, oval, trapezoidal, triangular, etc. The mechanical device for holding the cable anchor to the substructure can be of different combinations. Thus, the scope of the invention should be determined by the appended claims and their legal equivalents, rather than by the examples given.

We claim as our invention:

1. A compact cable anchor for retainment and attachment of cables and tubing which comprises: a one-piece Λ-shaped rigid body having sufficient thickness, width and length having a U-shaped top having open front, back and bottom having sufficient space to receive a cable or tubing having a W-cross sectional shape left side extension extending downward from the left side of said U-shaped top having an approximately 20 degree band from the center of said one-piece Λ-shaped rigid bodys body having sufficient radius transition to the left outward direction where said U-shaped top stops and said W-cross sectional shape left side extension begins, said U-shaped top having a W-cross sectional shaped right side extension extending downward from the right side of said U-shaped top having a 20 degree bend more or less from the center of said one-piece Λ-shaped rigid body having sufficient radius transition to the right outward direction where said U-shaped top stops and said W-cross sectional shape right side extension right side extension begins, said W-cross sectional shape left side extension and said W-shaped right side extension having a barb surface located at each extreme outer surface of the W-shape having sufficient space and surface as a locking device, said U-shaped top having an attachment hole having sufficient size located at top center for a mechanical means to attach a cable clip to said Λ-shaped rigid body.

2. The compact cable anchor for retainment and attachment of cables and tubing according to claim 1 wherein said U-shaped top may be flattened to facilitate said mechanical means of attachment.

3. The compact cable anchor for retainment and attachment of cables and tubing according to claim 1 wherein applying pressure to the outer surface of said W-cross sectional shape left side extension and said W-cross sectional shape right side extension causing said Λ-shaped rigid body to flex inward at the radius transition between said U-shaped top and said W-cross sectional shaped left side extension and said U-shaped top and said W-cross sectional shaped right side extension causing the space between extensions to become closer until said W-cross sectional shaped left side extension and said W-cross sectional shaped right side extension touch each other in a closed position allowing said Λ-shaped rigid body to be received in a bored hole in a substructure.

4. The compact cable anchor for retainment and attachment of cables and tubing according to claim 1 wherein said W-cross sectional shape left side extension and said W-shaped right side extension in the closed position facilitates an attachment means by allowing mechanical means of attachment to apply pressure on the inner surface of said W-cross sectional shape left side extension and said W-shaped right side extension thereby causing greater outward pressure of the said barb surface.

* * * * *